United States Patent
Victorelli (10) Patent No.: US 10,015,283 B2
(45) Date of Patent: Jul. 3, 2018

(54) REMOTE PROCEDURE CALL MANAGEMENT

(71) Applicant: NetApp Inc., Sunnyvale, CA (US)

(72) Inventor: Ronald J. Victorelli, Moon Township, PA (US)

(73) Assignee: NetApp Inc., Sunnyvale, CA (US)

( * ) Notice: Subject to any disclaimer, the term of this patent is extended or adjusted under 35 U.S.C. 154(b) by 233 days.

(21) Appl. No.: 14/811,954

(22) Filed: Jul. 29, 2015

(65) Prior Publication Data
US 2017/0034310 A1 Feb. 2, 2017

(51) Int. Cl.
*G06F 15/16* (2006.01)
*H04L 29/06* (2006.01)
*G06F 9/54* (2006.01)

(52) U.S. Cl.
CPC .............. *H04L 67/40* (2013.01); *G06F 9/547* (2013.01)

(58) Field of Classification Search
CPC ............. G06F 9/547; G06F 2209/5011; G06F 2209/5018; H04L 67/40; H04L 29/06; H04L 67/02; H04L 69/329
See application file for complete search history.

(56) References Cited

U.S. PATENT DOCUMENTS

| | | | | |
|---|---|---|---|---|
| 6,112,246 A * | 8/2000 | Horbal | .............. | G06F 17/30876 707/E17.112 |
| 6,219,706 B1 * | 4/2001 | Fan | ..................... | H04L 63/0254 709/225 |
| 6,477,561 B1 * | 11/2002 | Robsman | .............. | G06F 9/5083 718/102 |
| 6,763,387 B1 * | 7/2004 | Hickey | ............. | H04L 29/12254 709/224 |
| 7,401,118 B1 * | 7/2008 | Yokota | ................ | H04L 47/2458 709/203 |
| 7,725,818 B1 * | 5/2010 | Krishnan | ............... | G06Q 40/08 705/2 |
| 8,429,282 B1 * | 4/2013 | Ahuja | ..................... | H04L 47/19 709/219 |
| 9,313,604 B1 * | 4/2016 | Holcombe | ............ | H04W 4/001 |
| 2003/0009505 A1 * | 1/2003 | Cuomo | ................... | H04L 29/06 718/103 |
| 2003/0135609 A1 * | 7/2003 | Carlson | ................ | G06F 9/5011 709/224 |
| 2003/0167270 A1 * | 9/2003 | Werme | ..................... | G06F 9/06 |

(Continued)

*Primary Examiner* — Christopher Biagini
(74) *Attorney, Agent, or Firm* — Cooper Legal Group, LLC (57) ABSTRACT

One or more techniques and/or systems are provided for remote procedure call (RPC) management. For example, a thread pool, comprising one or more threads, may be maintained for parallel processing of RPC requests. RPC requests may be segmented into sets of RPC request task segments that may be queued into an RPC work queue for assignment to threads within the thread pool for execution. Counters may be used to monitor performance metrics associated with RPC execution throughput, queue performance, and/or other information regarding the execution of RPC requests. In this way, RPC requests may be executed in segments for parallel execution (e.g., as opposed to blocked a thread, an RPC request may release the thread, for use by a second RPC request, while waiting for a remote procedure to respond with output results). RPC requests may be throttled to mitigate saturation of resources by a single application.

20 Claims, 8 Drawing Sheets

(56) References Cited

U.S. PATENT DOCUMENTS

| | | | |
|---|---|---|---|
| 2003/0187998 A1* | 10/2003 | Petit | H04L 63/102 709/229 |
| 2005/0108710 A1* | 5/2005 | Patiejunas | H04L 29/06 718/100 |
| 2007/0263650 A1* | 11/2007 | Subramania | H04L 47/10 370/412 |
| 2008/0195843 A1* | 8/2008 | Muniandy | G06T 15/08 712/31 |
| 2009/0320029 A1* | 12/2009 | Kottomtharayil | G06F 9/505 718/102 |
| 2010/0287019 A1* | 11/2010 | Guo | G06F 11/3442 709/224 |
| 2012/0197770 A1* | 8/2012 | Raheja | G06F 17/2258 705/30 |
| 2015/0339168 A1* | 11/2015 | Mason | G06F 9/5027 718/104 |

* cited by examiner

REMOTE PROCEDURE CALL MANAGEMENT

BACKGROUND

Many computing environments may utilize remote procedure calls for transporting communication. For example, remote procedure calls may be used as inter-process communication, such as where an application may use a remote procedure call to cause a procedure to execute and provide a result. Open network computing remote procedure calls (ONCRPC) may be used to serialize data, such as by using an external data representation, which may be delivered to a destination using a user datagram protocol (UDP) and/or a transmission control protocol (TCP). A port mapper may provide access to remote procedure call services on a machine by listening for remote procedure call requests on a port over UDP and TCP.

A remote procedure call may comprise various stages of processing, such as reading a header of the remote procedure call, reading inputs from the remote procedure call, calling a remote procedure to execute functionality based upon the inputs, reading outputs from the remote procedure, and replying to a requestor that sent the remote procedure call. Various issues may arise with remote procedure calls, such as where a single requestor application may monopolize resources by repeatedly sending remote procedure call requests to a host computer of a remote procedure due to being stuck in a loop, and thus other applications may be starved from accessing remote procedure resources. Because remote procedure calls are handled in a synchronous manner, a long running remote procedure call may block the execution of other remote procedure calls (e.g., a thread used to execute the long running remote procedure call may be locked until I/O is completed, such as while the long running remote procedure call is waiting on output from a remote procedure). In this way, it may be difficult to scale inter-process communication due to a lack of remote procedure call management.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for remote procedure call (RPC) management are provided. A thread pool may be maintained for parallel processing of RPC requests. RPC requests may be queued, for processing by threads within the thread pool, based upon priorities assigned to RPC requests. RPC requests may be segmented into RPC request task segments so that segmented processing of RPC requests may be performed to increase throughput and decrease RPC request blocking. For example, as opposed to locking a thread while waiting on a response from a remote procedure, an RPC request (e.g., an RPC request task segment that called the remote procedure) may release the thread so that other RPC requests may execute using the thread. RPC processing and performance may be monitored in real-time, such as to collect various data relating to RPC execution throughput, RPC execution backlog, performance of an RPC request, a count of RPC transport executions, etc. In this way, processing resources may be efficiently utilized by parallel processing of RPC requests at an RPC request task segment granularity so that an RPC service and architecture may be scaled. Segmenting the processing of RPC requests into segments may utilize CPU and memory resources more efficiently. Using the thread pool to manage RPC requests, such as a bounded thread pool, may reduce a memory footprint. The techniques described herein also provide for using counters to track performance metrics of RPC execution, using memory pools for RPC data to reduce memory fragmentation, allowing RPC applications to be received on any service port, reducing a number of network ports used to support multiple RPC applications such as by assigning multiple applications to a single TCP port, prioritize payloads by an application layer, etc.

Figure 1:
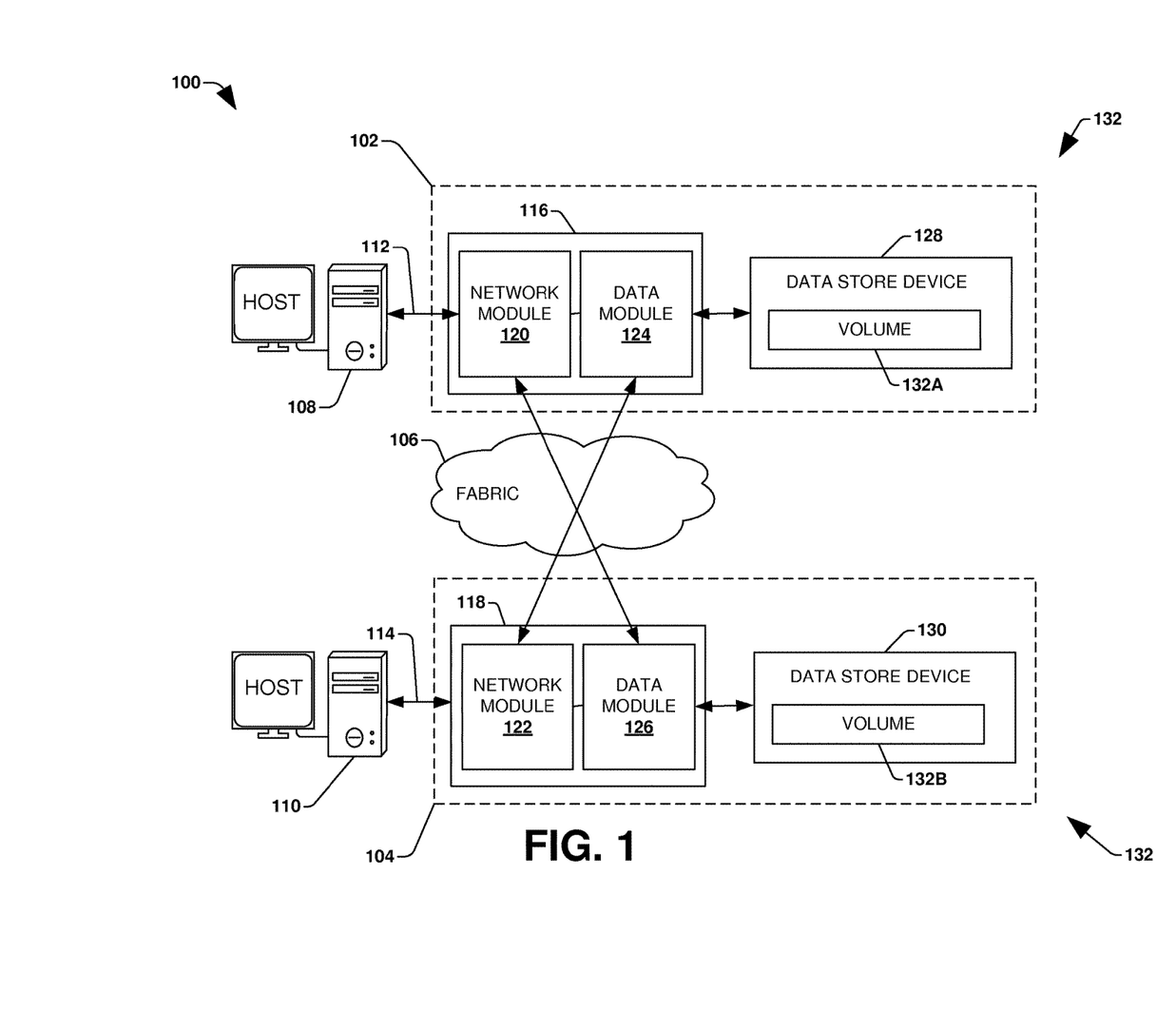
FIG. 1 is a component block diagram illustrating an example clustered network in accordance with one or more of the provisions set forth herein.

To provide context for remote procedure call management, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that remote procedure call (RPC) management may be implemented within the clustered network environment 100. For example, an RPC management component may be implemented for the node 116 and/or the node 118. The RPC management component may be configured to manage RPC communication between the node 116 and the node 118.

Figure 2:
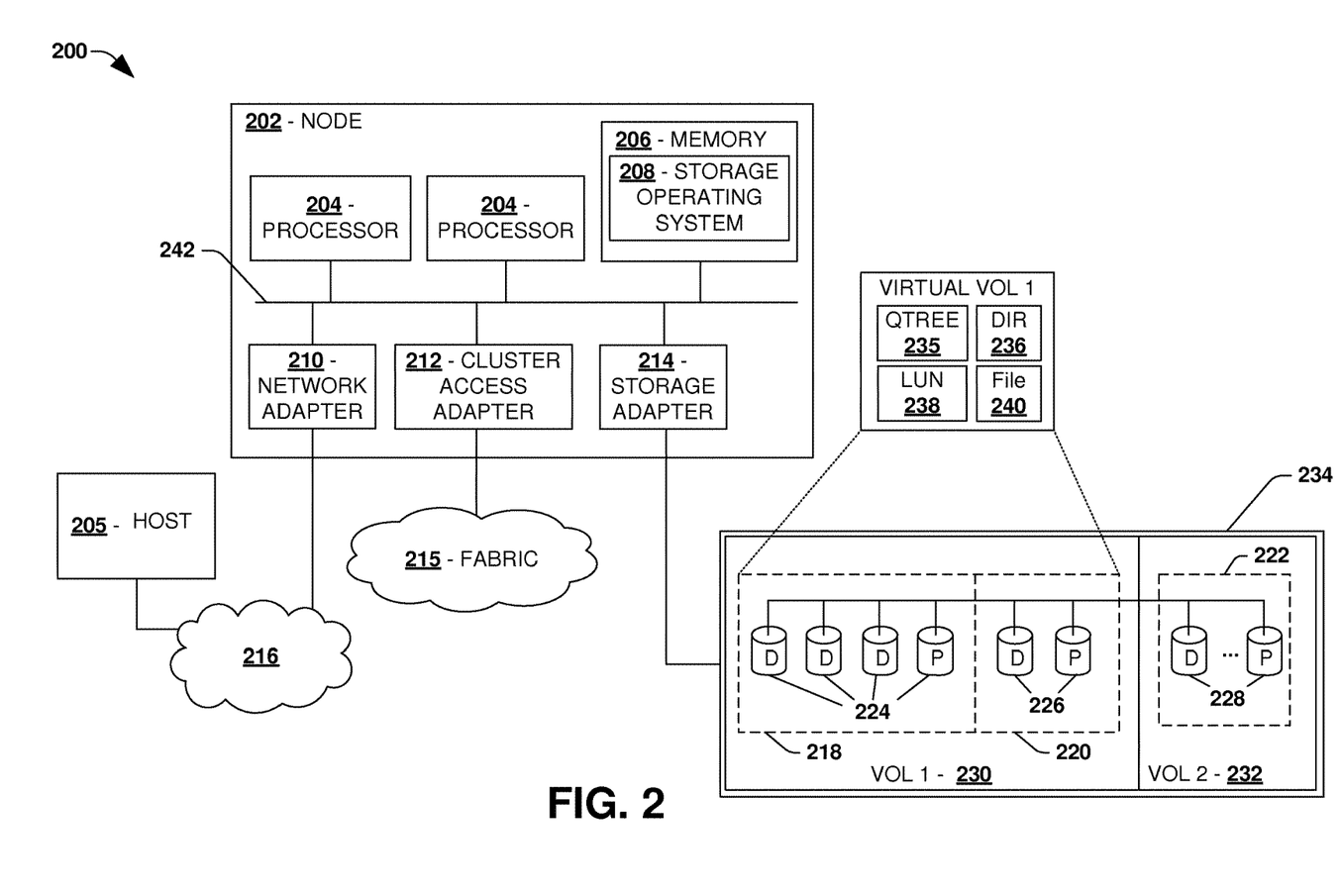
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that remote procedure call (RPC) management may be implemented for the data storage system 200. For example, an RPC management component may be implemented for the node 202. The RPC management component may be configured to manage RCP communication and processing to and from the node 202.

Figure 3:
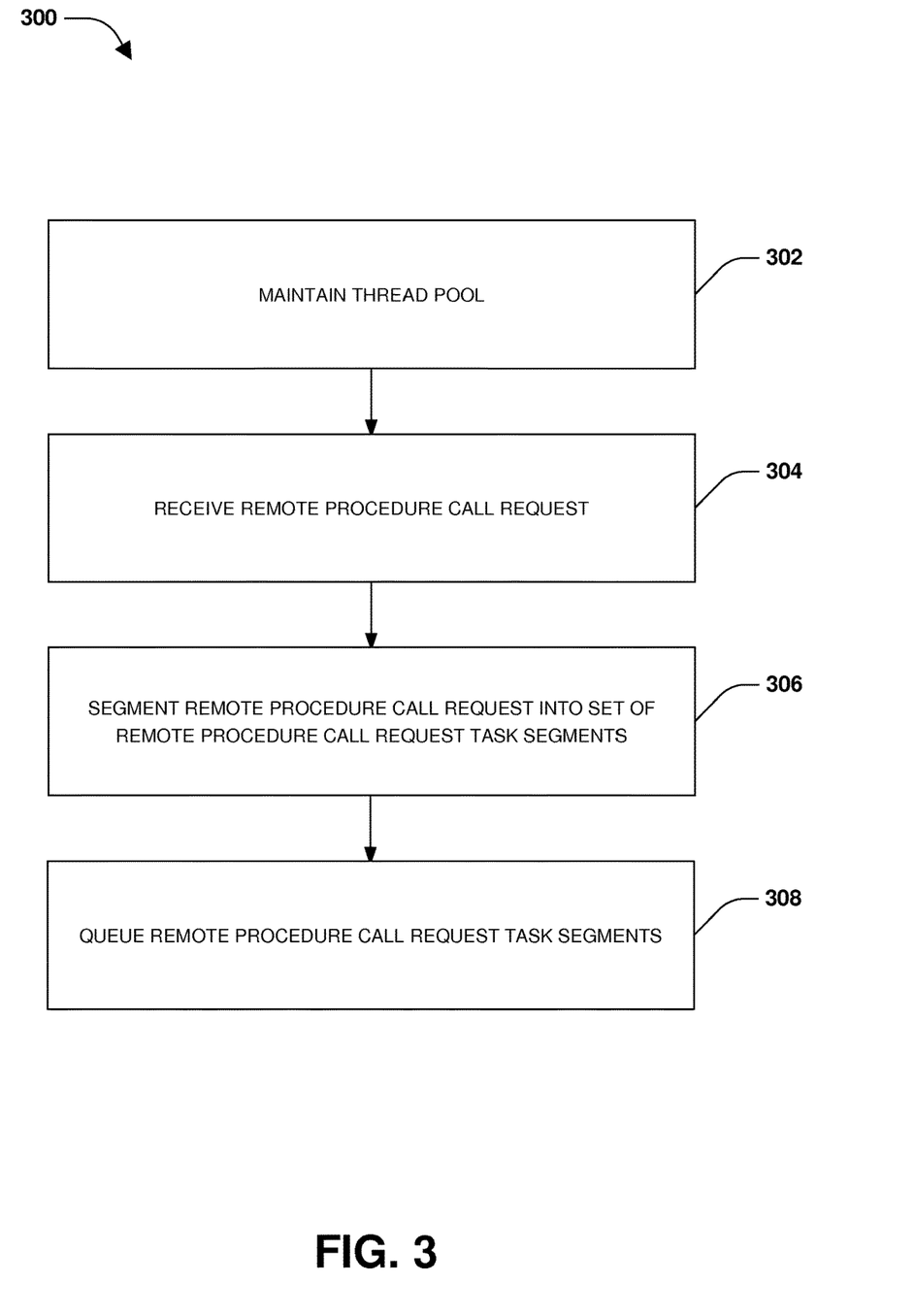
FIG. 3 is a flow chart illustrating an exemplary method of remote procedure call management.

One embodiment of remote procedure call (RPC) management is illustrated by an exemplary method 300 of FIG. 3. At 302, a thread pool, comprising one or more threads, may be maintained for parallel processing of RPC requests. RPC requests may be listened for over TCP ports. In an example, an application may be registered on multiple TCP ports for RPC request communication, such as an application being registered on a first TCP port and a second TCP port, which my increase RPC communication bandwidth for the application. In another example, multiple applications may be registered on a single TCP port for RPC request communication, such as a first application and a second application being registered to a TCP port. In this way, TCP ports may be listened to for incoming RPC requests from applications. At 304, an RPC request may be received.

At 306, the RPC request may be segmented into a set of RPC request task segments, such as a reader header segment (e.g., read metadata describing the RPC request), a read arguments segment (e.g., input arguments to a remote procedure and/or requested outputs from the remote procedure), a get priority segment (e.g., obtain priority of the RPC request from an application that submitted the RPC request and/or a determination of the priority based upon various criteria such as first-in first-out ordering), a call remote procedure segment (e.g., executing the remote procedure), a send reply segment (e.g., reply to the application with results of the remote procedure execution), etc. In an example, a segmentation data structure, specifying a set of asynchronous I/O events (e.g., a read header event, a read arguments event, a get priority event, a call remote procedure event, a send reply event, etc.) may be used to segment the RPC request for triggered execution based upon occurrence of such events (e.g., the send reply segment may be triggered based upon successful completion of the call remote procedure event; the call remote procedure segment may be triggered based upon successful completion of the get priority event; etc.). In an example, a dispatch state machine may be maintained for execution of the set of RPC request task segments. The dispatch state machine may be populated with a read RPC header state, a read RPC argument state, a query application for priority state, a call remote procedure state, a reply state, etc. In an example, a memory pool may be maintained for an RPC structure (e.g., the dispatch state machine; a dispatch object; etc.) used to manage the RPC request, which may reduce memory fragmentation.

At 308, RPC request task segments, within the set of request task segments, may be queued within an RPC work queue for assignment to threads within the thread pool for execution. RPC request task segments may be queued based upon priorities assigned by an application that sent the RPC request (e.g., assigned by an application layer) or may be determined based upon various criteria. In an example of determining a priority, a first RPC request task segment may be prioritized with a first priority, and a second RPC request task segment may be prioritized with a second priority less than the first priority. A relatively higher priority may be assigned based upon the set of RPC request task segments comprising an RPC request task segment that has already executed, and thus completion of currently undertaken RPC requests may be prioritized over new RPC requests (e.g., a reply RPC request task segment of a first RPC request may be prioritized over a read header RPC request task segment of a second RPC request where a call remote procedure RPC request task segment of the first RPC request has already executed and no RPC request task segments of the second RPC request have executed).

In an example, execution of the set of RPC request task segments may be evaluated to determine whether execution of an RPC request task segment exceeds a timeout threshold. Responsive to the execution of the RPC request task segment exceeding the timeout threshold, the RPC request may be timed out before an application layer is accessed for execution of one or more RPC request task segments within the set of RPC request task segments (e.g., an RPC request may be "short circuited" when known to have timed out client side).

In an example, an application may be identified as submitting a number of RPC requests exceeding a saturation threshold within a particular timespan. For example, the application may be stuck in a loop that repeatedly calls a remote procedure due to the loop. RPC request execution may be throttled for the application. In an example, a notification or alert of the application exceeding the saturation threshold may be created and/or provided such as to an administrator. In this way, applications may be restricted from saturating RPC processing.

In an example, RPC request execution may be monitored to identify poor performing application RPC execution, such as RPC execution that does not exceed an expected performance threshold (e.g., a time to complete threshold). A log may be created for the poor performing application RPC execution, such as for later debugging purposes.

Various performance metrics may be collected for real-time and/or post mortem evaluation. For example, a periodic counter may be maintained for RPC execution throughput data. A queue performance counter may be maintained for queue depth data of the RPC work queue and/or RPC execution backlog data. A thread counter may be maintained for RPC request identification data and performance data of currently execution R PC requests or previously executed RPC request (e.g., a last or currently executing RPC request). A summary countered may be maintained for a count of RPC transport executions. In this way, various performance metrics may be collected during the management of RPC request execution.

Figure 4:
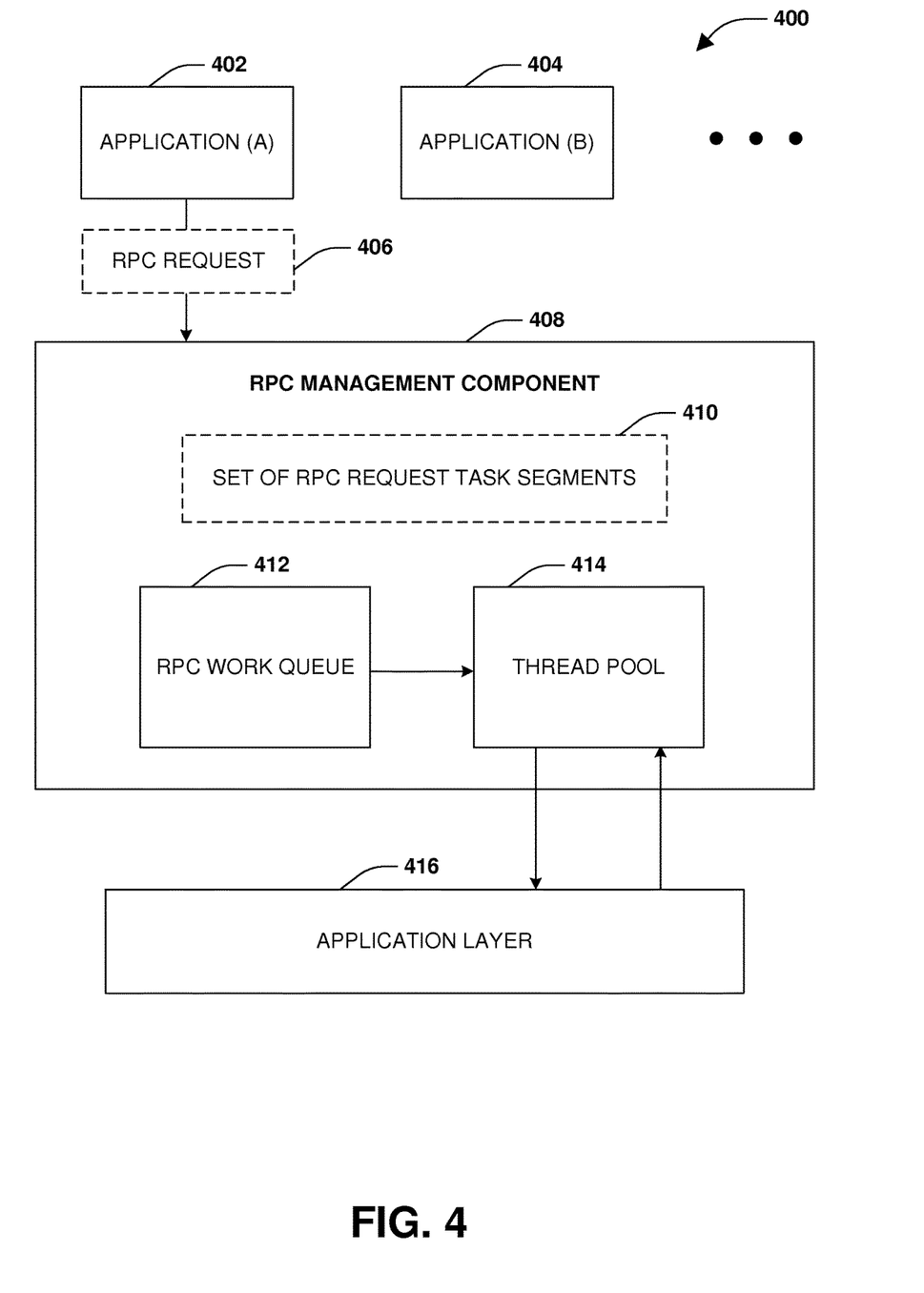
FIG. 4 is a component block diagram illustrating an exemplary system for remote procedure call management.

FIG. 4 illustrates an example of a system 400, comprising an RPC management component 408, for RPC management. The RPC management component 408 may assign an application (A) 402 to one or more TCP ports and an application (B) 404 to one or more TCP ports (e.g., an assignment of application (A) 402 and application (B) 404 to the same TCP port; an assignment of application (A) 402 to multiple TCP ports; etc.). The RPC management component 408 may listen to a TCP port for RPC requests, such as an RPC request 406 from application (A) 402. The RPC management component 408 may segment the RPC request 406 into a set of RPC request task segments 410, such as a read RPC header task segment, a read RPC argument task segment, an optional get application priority task segment, a call remote procedure task segment, a reply task segment, etc.

The RPC management component 408 may queue RPC request task segments, within the set of RPC request task segments 410, into an RPC work queue 412. For example, RPC request task segments may be queued based upon a priority set by an application layer 416 or based upon a first-in first-out queue configuration (e.g., a priority may be dynamically assigned based upon what RPC request task segments have executed or are waiting to execute). RPC request task segments may be dispatched from the RPC work queue 412 to threads within the thread pool 414 for parallel execution of RPC request task segments.

Figure 5:
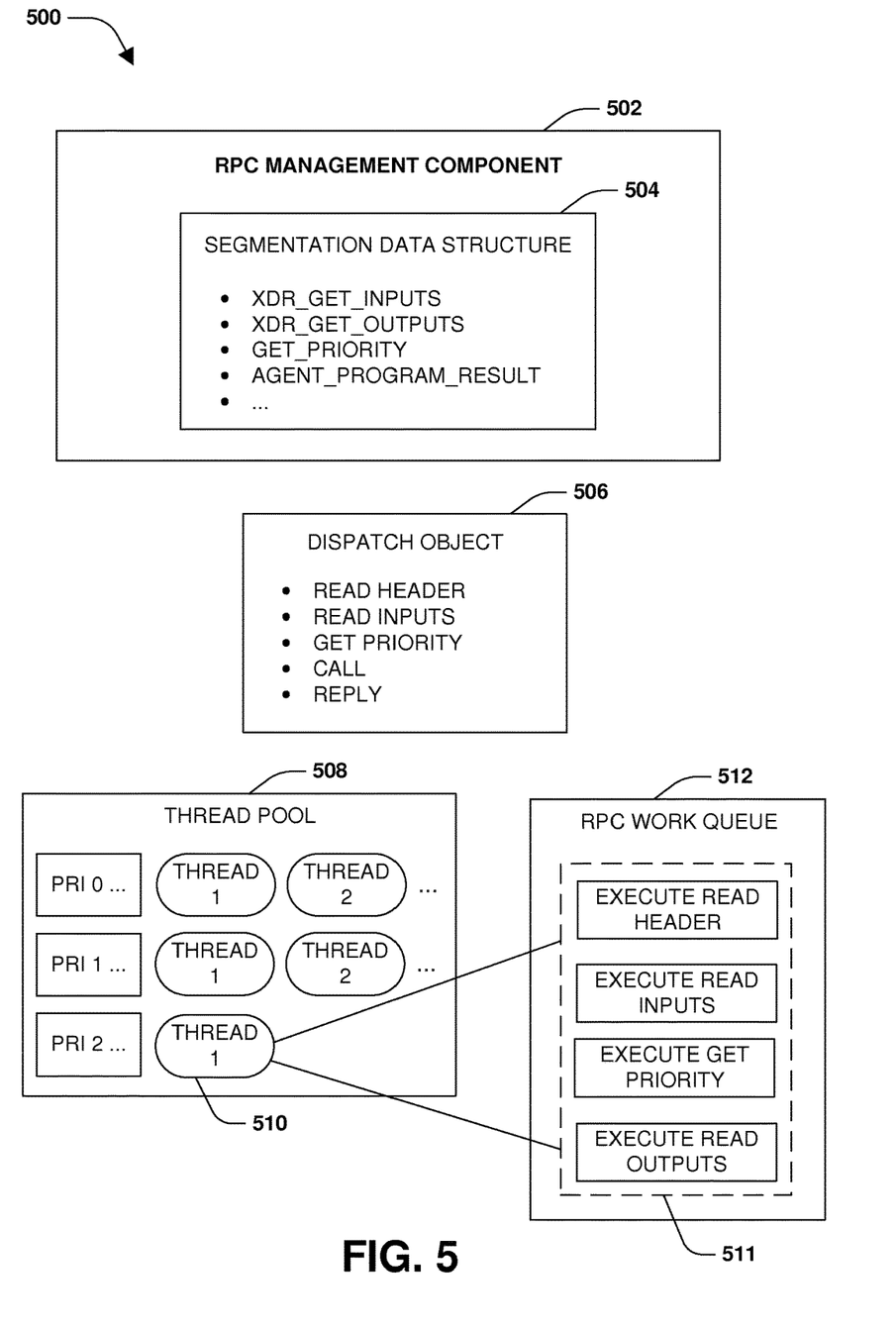
FIG. 5 is a component block diagram illustrating an exemplary system for remote procedure call management.

FIG. 5 illustrates an example of a system 500, comprising an RPC management component 502, for RPC management. The RPC management component 502 may maintain a segmentation data structure 504 used to segment RPC requests into RPC request task segments. For example, the segmentation data structure 504 may comprise external data representations (XDR) and/or other data representations used to parse an RPC request, such as to identify a get inputs function, a get outputs function, a get priority function, an object application results function, and/or a variety of other functions that may correspond to asynchronously executable segments of the RPC request.

The RPC management component 502 may create an RPC data structure, such as a dispatch object 506, used to represent and manage the RPC request. For example, the dispatch object 506 may track execution, thread assignment, priority, and/or other information relating to RPC request task segments of the RPC request, such as reading a header of the RPC request, reading inputs of the RPC request, obtaining a priority for the RPC request, calling a remote procedure, replying to an application that sent the RPC request, etc.

The RPC management component 502 may maintain a thread pool 508 comprising one or more threads for parallel processing of RPC requests. In an example, the thread pool 508 may be a bounded thread pool with a specified number of available threads. The thread pool 508 may have threads assigned to various priorities, such as a priority 0, a priority 1, a priority 2 (e.g., merely a single thread may be available for processing priority 2 RPC requests), etc. An RPC request assigned to a thread having a relatively higher priority may receive more execution time, more execution frequency, and/or less wait time for execution than other RPC requests assigned to relatively lower priorities.

The RPC management component 502 may maintain an RPC work queue 512 within which RPC request task segments of RPC requests are queued for execution by the threads within the thread pol 508. For example, a first RPC request 511 may have been segmented into an execute read header task segment, an execute read inputs task segment, an execute get priority segment, an execute read outputs task segment, etc. The RPC request task segments may be queued within the RPC work queue 512 for assignment to a first thread 510 having the priority 2. In this way, RPC requests may be assigned to threads within the thread pool 508 for parallel execution.

Figure 6:
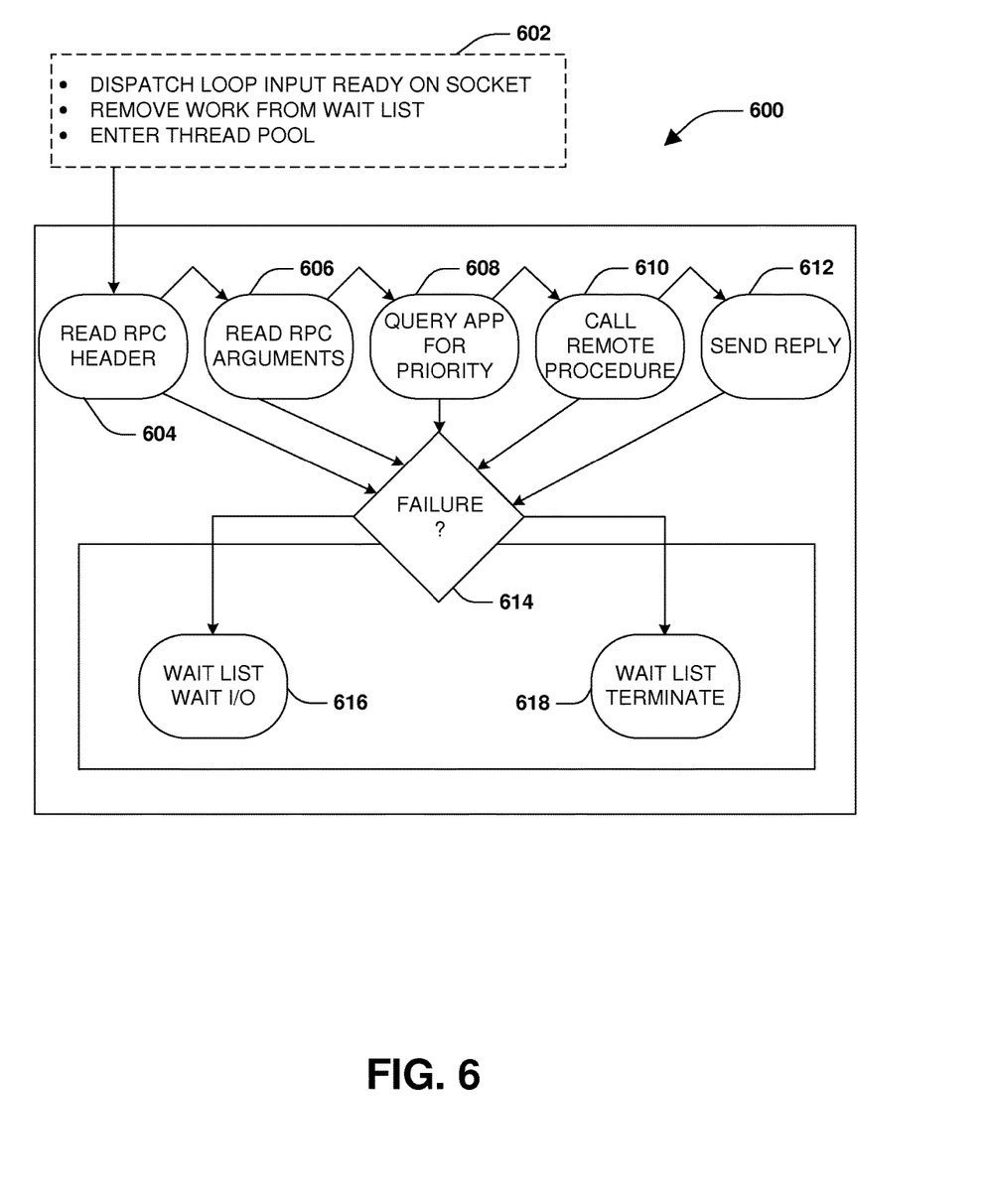
FIG. 6 illustrates an example of a dispatch state machine.

FIG. 6 illustrates an example of dispatch state machine 600 maintained by an RPC management component. The RPC management component may maintain the dispatch state machine 600 for managing the execution of a set of RPC request task segments of an RPC request. The dispatch state machine 600 may be initialized responsive to the RPC request being in a process ready state 602 (e.g., a dispatch loop input may be ready on a socket to receive the RPC request; a worker may be removed from a wait list for processing the RPC request; and the RPC request, such as RPC request task segments of the RPC request, may enter into a thread pool for execution such as by being assigned to threads within the thread pool).

The dispatch state machine 600 may comprise a read RPC header state 604 for identifying information specified by the RPC request. Responsive to successful completion of the read RPC header state 604, the dispatch state machine 600 may transition into a read RPC arguments state 606 for reading inputs used to call a remote procedure. Responsive to successful completion of the read RPC arguments state 606, the dispatch state machine 600 may transition into a query application for priority state 608 for optionally obtaining a priority used to queue the RPC request for assignment to threads within the thread pool. Responsive to successful completion of the query application for priority state 608, the dispatch state machine 600 may transition into a call remote procedure state 610 for executing the remote procedure using inputs from the RPC request. Responsive to successful completion of the call remote procedure state 610, the dispatch state machine 600 may transition into a send reply state 612 for responding with results of the remote procedure to the application that sent the RPC request. If one of the states 604-612 fails (e.g., a timeout occurs), then the dispatch state machine 600 may transition into a determination state 614 to determine whether the RPC request failed. If the RPC request failed, then the RPC request may be terminated 618, otherwise if the RPC request has not failed, the RPC request may wait 616 for I/O (e.g., a call remote procedure task may be waiting on a result from the remote procedure, and thus may release a thread for execution of other RPC requests while waiting on the result).

Figure 7:
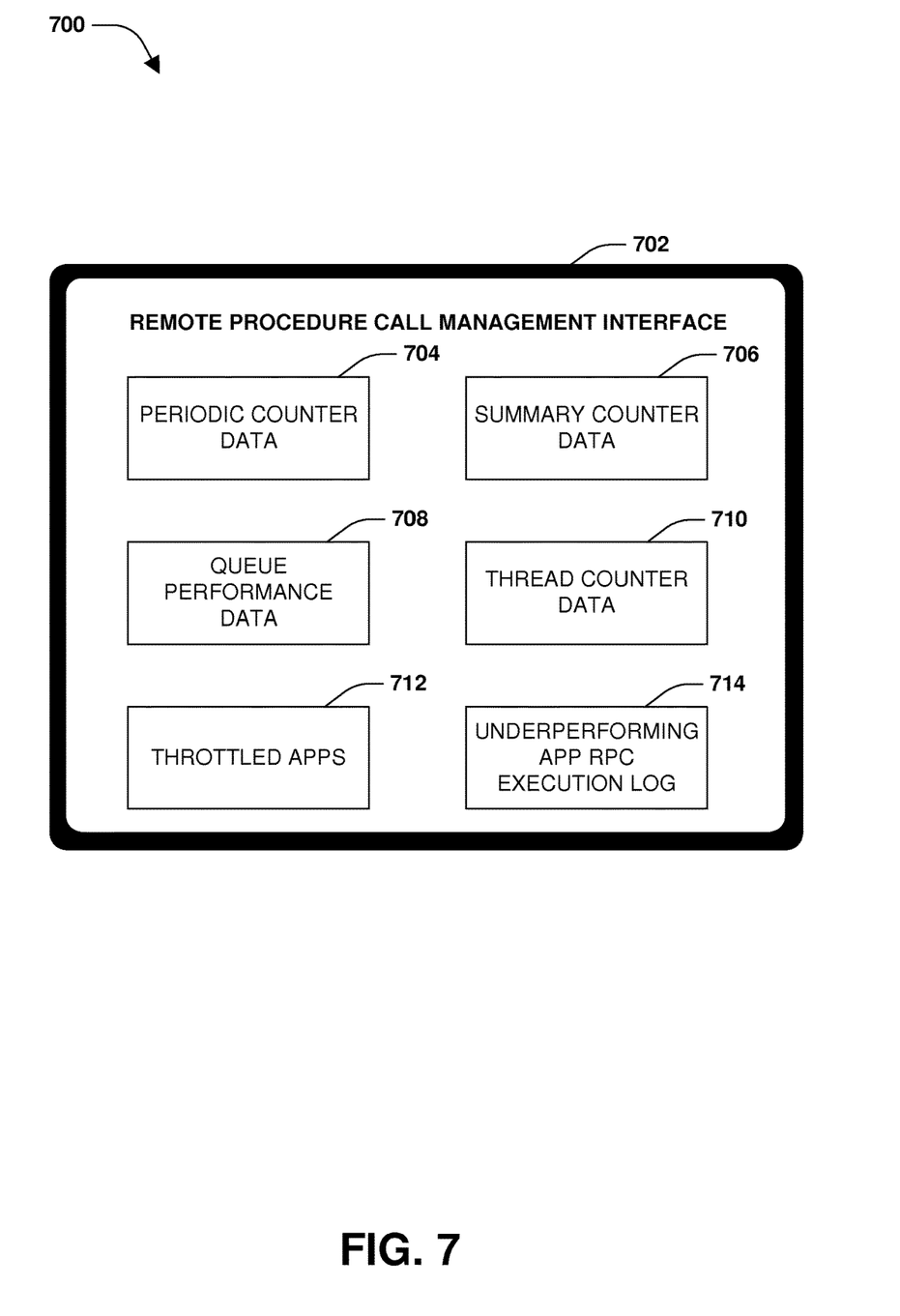
FIG. 7 illustrates an example of a remote procedure call management interface.

FIG. 7 illustrates an example 700 of a remote procedure call (RPC) management interface 702 through which information relating to the management of RCPs may be displayed. An RPC management component may maintain a periodic counter corresponding to RPC execution throughput, which may be displayed through a periodic counter data user interface 704. The RPC management component may maintain a summary counter corresponding to a count of RPC transport executions, which may be displayed through a summary counter data user interface 706. The RPC management component may maintain a queue performance counter corresponding to at least one of a queue depth of an RPC work queue or an RPC execution backlog, which may be displayed through a queue performance data user interface 708. The RPC management component may maintain a thread counter corresponding to identification and performance data of at least one of a currently executing RPC request or a previously executed RPC request (e.g., a last executed RPC request), which may be displayed through a thread counter data user interface 710. The RPC management component may throttle RPC request execution of RPC requests from applications that submit a saturation threshold number of RPC requests (e.g., applications that may be stuck in a loop that repeatedly submit RPC requests), and such information may be displayed through a throttled apps user interface 712. The RPC management component may monitor RPC request execution for logging application RPC execution that does not exceed an expected performance threshold, and such information may be displayed through an underperforming app RPC execution log 714.

Figure 8:
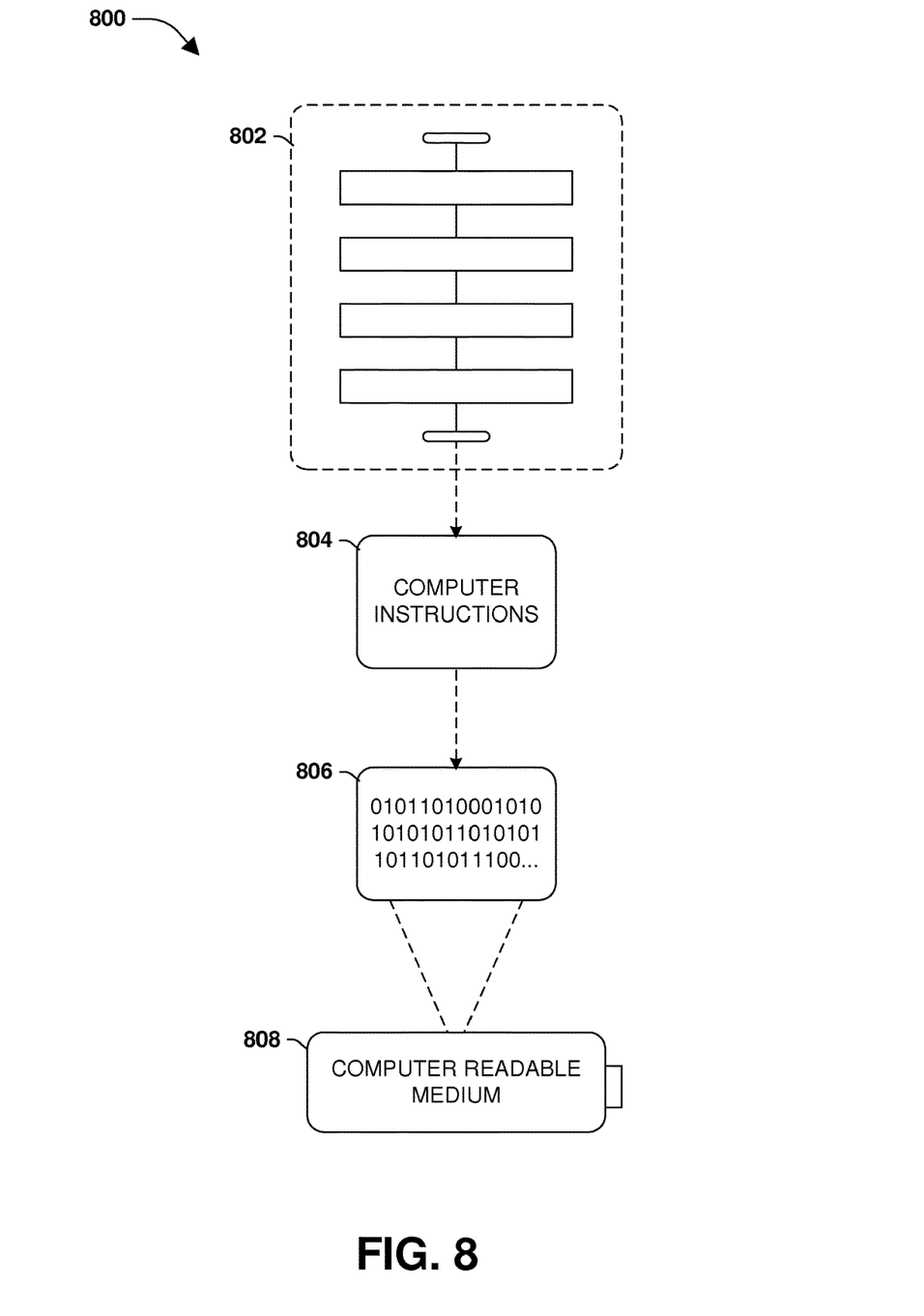
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 300 of FIG. 3, for example. In some embodiments, the processor-executable instructions 804 are configured to implement a system, such as at least some of the exemplary system 400 of FIG. 4 and/or at least some of the exemplary system 500 of FIG. 5, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", with, or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device, comprising:
   a processor; and
   a memory containing instructions which when executed by the processor cause the processor to:
   maintain a thread pool, comprising threads, for parallel processing of remote procedure call (RPC) requests;
   receive an RPC request;
   maintain a segmentation data structure specifying a set of asynchronous I/O events comprising a read RPC header event, a read RPC arguments event, a get RPC priority event, a call remote procedure event, and a send reply event;
   segment the RPC request into a read RPC header segment, a read RPC arguments segment, a get RPC priority segment, a call remote procedure segment, and a send reply segment as a set of RPC request task segments using the segmentation data structure to parse the RPC request;
   queue RPC request task segments, within the set of RPC request task segments, within an RPC work queue for assignment to threads within the thread pool for execution; and
   assign a first priority to a first RPC request task segment of the RPC request and a second priority, less than the first priority, to a second RPC request task segment of a second RPC request to cause the first RPC request task segment to be queued in a higher queue position than the second RPC request task within the RPC work queue, wherein the first priority is assigned based upon at least one RPC request task segment of the RPC request having already been executed, and wherein the second priority is assigned based upon no RPC request task segments of the second RPC request having been executed.

2. The computing device of claim 1, wherein the RPC work queue is a first-in first-out queue.

3. The computing device of claim 2, wherein the instructions cause the processor to:
   dynamically assign priorities and queue positions within the RPC work queue to RPC request task segments based upon already executed RPC request task segments and pending RPC request task segments.

4. The computing device of claim 1, the first priority specified by an application layer.

5. The computing device of claim 1, wherein the instructions cause the processor to:
   register a first application and a second application on a single TCP port for RPC request communication.

6. The computing device of claim 1, wherein the instructions cause the processor to:
   register an application on a first TCP port and a second TCP port for RPC request communication.

7. The computing device of claim 1, wherein the instructions cause the processor to:
   utilize the segmentation data structure to parse the RPC request into the set of RPC request task segments for triggered execution.

8. The computing device of claim 1, wherein the instructions cause the processor to:
   evaluate execution of the set of RPC request task segments to determine whether execution of an RPC request task segment exceeds a timeout threshold;

determine that the execution of the RPC request task segment exceeds the timeout threshold; and timing out the RPC request before accessing an application layer for execution of RPC request task segments within the set of RPC request task segments.

9. The computing device of claim 1, wherein the instructions cause the processor to:

maintain a dispatch state machine for execution of the set of RPC request task segments.

10. The computing device of claim 9, wherein the instructions cause the processor to:

maintain a read RPC header state, a read RPC argument state, a query application for priority state, a call remote procedure state, and a reply state within the dispatch state machine.

11. The computing device of claim 1, wherein the instructions cause the processor to:

maintain a periodic counter corresponding to RPC execution throughput.

12. The computing device of claim 1, wherein the instructions cause the processor to:

maintain a queue performance counter corresponding to a queue depth of the RPC work queue and an RPC execution backlog.

13. The computing device of claim 1, wherein the instructions cause the processor to:

maintain a thread counter corresponding to identification and performance data of a currently executing RPC request and a previously executed RPC request.

14. The computing device of claim 1, wherein the instructions cause the processor to:

maintain a summary counter corresponding to a count of RPC transport executions.

15. The computing device of claim 1, wherein the instructions cause the processor to:

identify an application submitting a number of RPC requests exceeding a saturation threshold; and throttle RPC request execution for the application.

16. The system of claim 1, wherein the instructions cause the processor to:

monitor RPC request execution for logging application RPC execution that does not exceed an expected performance threshold.

17. The computing device of claim 1, wherein the instructions cause the processor to:

maintain a memory pool for an RPC structure used to manage the RPC request.

18. A method for remote procedure call (RPC) management, comprising:

maintaining a thread pool, comprising threads, for parallel processing of RPC requests;

receiving an RPC request;

maintaining a segmentation data structure specifying a set of asynchronous I/O events comprising a read RPC header event, a read RPC arguments event, a get RPC priority event, a call remote procedure event, and a send reply event;

segmenting the RPC request into a read RPC header segment, a read RPC arguments segment, a get RPC priority segment, a call remote procedure segment, and a send reply segment as a set of RPC request task segments using the segmentation data structure to parse the RPC request;

queuing RPC request task segments, within the set of RPC request task segments, within an RPC work queue for assignment to threads within the thread pool for execution; and assigning a first priority to a first RPC request task segment of the RPC request and a second priority, less than the first priority, to a second RPC request task segment of a second RPC request to cause the first RPC request task segment to be queued in a higher queue position than the second RPC request task within the RPC work queue, wherein the first priority is assigned based upon at least one RPC request task segment of the RPC request having already been executed, and wherein the second priority is assigned based upon no RPC request task segments of the second RPC request having been executed.

19. The method of claim 18, comprising:

maintaining a periodic counter corresponding to RPC execution throughput;

maintaining a queue performance counter corresponding to a queue depth of the RPC work queue;

maintaining a thread counter corresponding to identification and performance data of a previously executed RPC request; and maintaining a summary counter corresponding to a count of RPC transport executions.

20. A non-transitory computer readable medium comprising instructions which when executed perform a method for remote procedure call (RPC) management, comprising:

maintaining a thread pool, comprising threads, for parallel processing of RPC requests;

receiving an RPC request;

maintaining a segmentation data structure specifying a set of asynchronous I/O events comprising a read RPC header event, a read RPC arguments event, a get RPC priority event, a call remote procedure event, and a send reply event;

segmenting the RPC request into a read RPC header segment, a read RPC arguments segment, a get RPC priority segment, a call remote procedure segment, and a send reply segment as a set of RPC request task segments using the segmentation data structure to parse the RPC request;

queuing RPC request task segments, within the set of RPC request task segments, within a RPC work queue for assignment to threads within the thread pool for execution; and assigning a first priority to a first RPC request task segment of the RPC request and a second priority, less than the first priority, to a second RPC request task segment of a second RPC request to cause the first RPC request task segment to be queued in a higher queue position than the second RPC request task within the RPC work queue, wherein the first priority is assigned based upon at least one RPC request task segment of the RPC request having already been executed, and wherein the second priority is assigned based upon no RPC request task segments of the second RPC request having been executed.

* * * * *